May 22, 1923.
C. MOSS
ATTACHING DEVICE FOR NONSKID CHAINS
Filed June 24, 1920
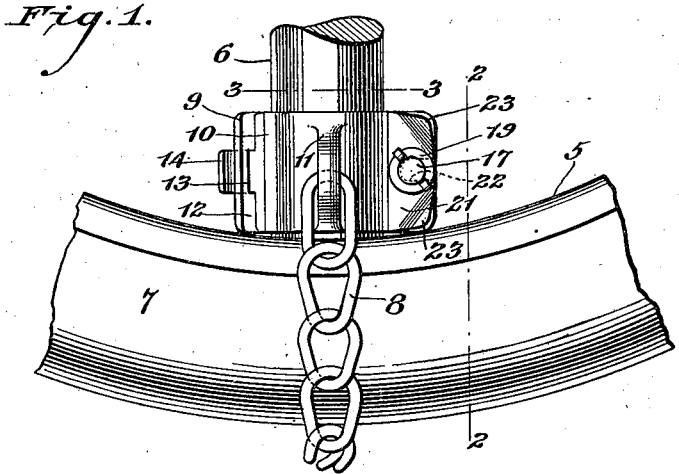
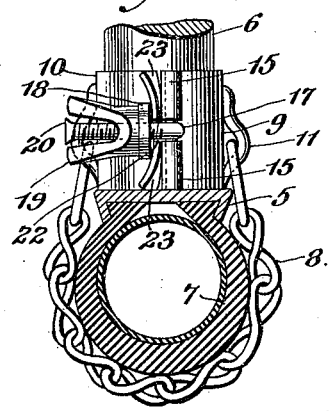
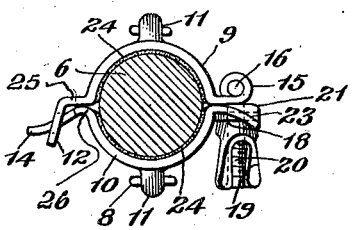
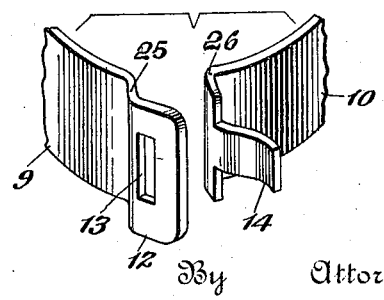
Inventor
Charles Moss,
By Attorney
C. P. Goepel.

Patented May 22, 1923.

1,456,071

UNITED STATES PATENT OFFICE.

CHARLES MOSS, OF NEW YORK, N. Y.

ATTACHING DEVICE FOR NONSKID CHAINS.

Application filed June 24, 1920. Serial No. 391,388.

*To all whom it may concern:*

Be it known that I, CHARLES MOSS, a citizen of the United States, and a resident of the city of New York, county of New York, and State of New York, have invented certain new and useful Improvements in Attaching Devices for Nonskid Chains, of which the following is a specification.

This invention relates to improvements in attaching device for non-skid chains, and has for its primary object to provide a simple and inexpensive means for quickly applying or attaching emergency non-skid chains to motor vehicle wheels.

Broadly considered it is the main object of my present improvement to provide a device for the above purpose which is of such construction that all of the various parts remain operatively assembled when the non-skid chain is removed from the wheel, as well as when such chain is in its applied position.

It is one of the detail objects of the invention to provide an attaching means which is constructed in two complementary parts permanently attached respectively to the opposite ends of the chain, said parts adapted to embrace a wheel spoke, and having interlocking portions at one of their ends, and clamping means on the other end of one of said parts, including a swivel bolt adapted to be seated in a recess in the end of the other part, a non-removable nut threaded on said bolt, and a washer acted upon by said nut, the end of the last-named part of the device being curved or bent at opposite sides of the recess therein so as to prevent the disengagement of the bolt from said recess in the event that the nut should be accidentally loosened.

It is a further general object of the invention to provide a non-skid chain attaching device which can be applied to, or removed from the wheel with ease and facility, and which is of relatively simple construction, and can therefore be manufactured and sold at nominal cost.

With the above and other objects in view, the invention consists in the improved form, construction and relative arrangement of the several parts, as will be hereinafter more fully set forth, and incorporated in the subjoined claim.

Referring to the drawings, wherein I have illustrated one practical and satisfactory embodiment of the invention, and in which similar reference characters designate corresponding parts throughout the several views:

Figure 1 is a fragmentary side elevation of a wheel having the improved chain attaching device applied thereto.

Figure 2 is a transverse sectional view taken on the line 2—2 of Figure 1.

Figure 3 is a sectional view taken on the line 3—3 of Figure 1, and,

Figure 4 is a fragmentary perspective view of the interlocking end portions of the attaching clamp.

Referring in detail to the drawings, 5 designates the rim portion of an automobile wheel which is suitably secured upon the wheel spokes 6, and in which the wheel tire 7 is adapted to be arranged and secured in any approved manner.

In the illustrated embodiment of my invention I have shown the emergency non-skid device as consisting of a length of link chain 8. It is, however, to be clearly understood that the present embodiment, which relates solely to the attaching means for the device, is not to be limited to such a chain or other specific form of the non-skid means, since, obviously, the chain might be provided intermediate of its length with ground engaging tread members of any desired and approved form.

As illustrated, the attaching device comprises two complementary clamping plates 9 and 10 respectively, which are adapted to be positioned upon opposite sides of one of the wheel spokes 6 to snugly embrace the same. To the outer side of each of these curved plates at the approximate center thereof one end link of the chain 8 is attached, by means of a looped strap or bracket element 11, which, at its ends, is riveted, welded or otherwise permanently fixed to the plate.

One end of the plate 9 is provided with an outwardly projecting lug 25 extending radially with respect to the spoke 6. The lug 25 carries a diagonally projecting flange 12 having a slot 13 to receive the tongue 14 carried by the adjacent end of the companion curved plate 10. It will be noted, particularly with reference to Figure 3, that the flange 12 is substantially at a tangent to the curved plates 9 and 10 or parallel with a tangent to these plates. The tongue 14 is curved with its convex side away from the plate 9 and engaging the outer wall of the slot 13. A rounded heel 26 is formed between the plate 10 and the tongue 14, this heel having a bearing on the lug 25. The convex side of the tongue 14 providing a bearing on the outer wall of the slot 13 of flange 12, and the heel 26 with its bearing upon the lug 25 avoids distortion of these parts and of the members 9 and 10, prevents rattling of the device and enables the tongue to be more easily centered and engaged with the slot 13.

At its opposite end the plate 9 is provided with spaced hinge knuckles 15, in which a pintle 16 is permanently fixed. A clamp bolt 17 is loosely engaged at one of its ends upon the medial portion of the pintle 16 for free swinging movement. Upon the threaded portion of the bolt 17 a washer 18 is disposed, and a nut 19, preferably of the wing type, is permanently threaded upon said bolt. The removal of the nut from the bolt is prevented by swaging the end of the bolt, as at 20, so as to increase the diameter thereof.

The corresponding end of the other spoke embracing plate 10 is formed with an outwardly projecting lateral flange 21, which is medially slotted, as shown at 22, to receive the bolt 17. The flange 21 at opposite sides of the slot 22 therein is curved or bent in an outward direction, as indicated at 23, the purpose of which will be presently explained.

In the application of the emergency skid devices to the wheel, said devices are arranged in any desired number, and in suitably spaced relation transversely across the wheel tire, and the attaching plates or members 9 and 10 on the ends of the chain are brought together at opposite sides of one of the wheel spokes. These plates at one of their ends are connected by the interlocking tongue and slotted flange. The bolt 17 on the other end of the plate 9 at the opposite side of the spoke is then swung inwardly into the slot 22 in the opposed end of the plate 10. The nut 19 is now adjusted upon the bolt 17 to urge the washer 18 against the flange 21 and thereby draw the ends of the two plates 9 and 10 together and tightly clamp said plates upon the spoke. In order to prevent the scratching or marring of the finish on the wheel spokes, these plates are preferably lined upon their interior surfaces with felt or other suitable cushioning material, as indicated at 24. When the two parts of the attaching clamp have thus been securely connected around the wheel spoke, it will be seen that the non-skid device will be properly held in position upon the tire, and all possibility of its accidental loss precluded. Owing to the angular relationship of the flange 12 and tongue 14 of the clamping members, these ends of said members cannot, through any possibility, become separated, and by reason of the bending or curving of the flange 21 on the plate 10, even should the nut 19 become somewhat loosened, these curved portions of said flange would be engaged by the washer 18, so that the bolt 17 could not swing out of the slot 22, and permit the plates to separate. In order to effect such separation, it is necessary to thread the nut 19 outwardly for a considerable distance upon the threaded bolt.

When the emergency skid device is removed from the vehicle wheel, it will be seen that all parts of the attaching means for said device remain connected, so that they cannot become separated and lost, whereby the device would be rendered inapplicable to the wheel. It will thus be apparent that I have devised a construction and arrangement of the attaching means for non-skid devices which is of considerable practical utility. At the same time it will be noted that the article is of very simple construction, and, as the two plates or members of the attaching means are at all times connected to the links of the chain for application to the spoke, such application may be made with ease and facility, without requiring the manipulation of snap hooks or other various devices for the attachment of the non-skid chains to the clamp.

The several parts of the device are also strong and durable, and will, therefore, serviceably withstand severe usage.

From the foregoing description considered in connection with the drawings, the construction, manner of operation and several advantages of my improved device will be clearly understood. I have herein disclosed what I consider to be a very practical and satisfactory embodiment of the invention, though it is to be understood that in practice the device may also be embodied in various other alternative constructions. Accordingly I reserve the privilege of adopting all such changes and modifications within the spirit and scope of the invention as claimed.

I claim:

An attaching device for non-skid chains comprising a clamp composed of two plates, said plates being curved outwardly in opposite directions to complementally fit about a spoke of a wheel, the outside faces of such curved plates having straps to receive the non-skid chain, one of said plates having at one end an outwardly and radially projecting lug, said lug having a slotted flange projecting angularly therefrom and lying at substantially a tangent to the plates but being spaced from the plates, the corresponding end of the companion plate having a rounded heel engaging the adjacent face of said lug and being further provided with a curved tongue adapted to fit slidably through the slot in said flange, the convex side of said curved tongue being away from the companion plate, radially projecting flanges at the opposite ends of said plates, a hinged bolt carried by one of these flanges, the opposing flange being slotted to receive the bolt, such opposing flange having its corners turned outwardly away from the flange carrying the bolt, and a bolt engaging element confined by said outwardly turned corner portions.

In testimony that I claim the foregoing as my invention, I have signed my name.

CHARLES MOSS.